(12) United States Patent
Biswas et al.

(10) Patent No.: US 7,645,314 B2
(45) Date of Patent: Jan. 12, 2010

(54) COMPOSITION USEFUL FOR MAKING SLOW RELEASE NITROGEN FREE PHOSPHOROUS, POTASSIUM AND SULFUR OXIDE GLASS AND A PROCESS OF MAKING GLASS THEREFROM

(75) Inventors: Nisha Biswas, Kolkata (IN); Gour Krishna Das Mahapatra, Kolkata (IN); Koushik Ghosh, Kolkata (IN)

(73) Assignee: Council of Scientific & Industrial Research, New Delhi (IN)

( * ) Notice: Subject to any disclaimer, the term of this patent is extended or adjusted under 35 U.S.C. 154(b) by 703 days.

(21) Appl. No.: 11/005,806

(22) Filed: Dec. 6, 2004

(65) Prior Publication Data
US 2006/0117823 A1    Jun. 8, 2006

(51) Int. Cl.
*C05D 9/02* (2006.01)
*C05D 9/00* (2006.01)
*C05B 7/00* (2006.01)
*C05B 17/00* (2006.01)
*C03C 3/23* (2006.01)
*C03C 3/247* (2006.01)
*C03C 3/16* (2006.01)
*C03C 3/21* (2006.01)

(52) U.S. Cl. .............. 71/31; 71/32; 501/43; 501/44; 501/45; 501/48

(58) Field of Classification Search ............ 501/43, 501/44, 45, 48; 71/31, 32
See application file for complete search history.

(56) References Cited

U.S. PATENT DOCUMENTS

| | | | |
|---|---|---|---|
| 3,762,902 A | 10/1973 | Wagner et al. | |
| 3,930,833 A | 1/1976 | Robets | |
| 3,958,973 A | 5/1976 | Roberts | |
| 4,123,248 A | 10/1978 | Drake | |
| 4,148,623 A | 4/1979 | Drake | |
| 4,334,908 A * | 6/1982 | Duchateau et al. | 71/52 |
| 4,407,786 A | 10/1983 | Drake et al. | |
| 5,328,874 A * | 7/1994 | Beall et al. | 501/45 |
| 6,217,629 B1 * | 4/2001 | Kunin | 71/27 |
| 6,488,735 B1 | 12/2002 | Macchioni et al. | |

* cited by examiner

*Primary Examiner*—Jerry Lorengo
*Assistant Examiner*—Matthew E Hoban
(74) *Attorney, Agent, or Firm*—Luedeka, Neely & Graham, PC

(57) ABSTRACT

Di-ammonium phosphate, murate of potash and gypsum are the conventional phosphorous, potassium and sulfur fertilizers respectively. Application of gypsum to soil can cause an increase calcium load on soil and polluted surface and underground water. The most successful technique is application of phosphorous-potassium-sulfur glass which can be added directly to the soil. Main feature of the present invention is formulation and making of a composition of high phosphorous, potassium and sulfur containing glass free from alkali like $Na_2O$, $Li_2O$ and ZnO, which are toxic to the plants. Such glasses are capable of slow release of phosphorous, potassium and sulfur required in the area of agriculture, fungicide, pesticide and weedicides etc. The present invention also emphasize optimization of nutrient content, reduction of calcium load on the soil, minimization of surface and underground water pollution and maintenance of acidic environment near the plant roots in the soil.

19 Claims, No Drawings

COMPOSITION USEFUL FOR MAKING SLOW RELEASE NITROGEN FREE PHOSPHOROUS, POTASSIUM AND SULFUR OXIDE GLASS AND A PROCESS OF MAKING GLASS THEREFROM

The present invention relates to a composition useful for making slow release nitrogen free phosphorous, potassium and sulfur oxide glass and a process of making glass therefrom. The process of the present invention provides high content phosphorous, potassium and sulfur glass capable of slow release of phosphorous, potassium and sulfur which particularly relates to the application of the glass as fertilizer for agricultural applications and for any other plant which requires phosphorous, potassium and sulfur as their elemental combinations. These materials may have applications in such other fields where controlled release of phosphorous, potassium and sulfur is required such as fungicide, weedicide and for purposes other than agriculture.

It is known that fertilizer elements, i.e., the elements that provide the nutrients required for the growth of crops, are divided into three categories; major elements, i.e.; nitrogen (N), Phosphorous (P) and Potassium (K); Secondary elements, i.e.; calcium (Ca), magnesium (Mg) and sulfur (S); and micronutrient elements, i.e., boron (B), cobalt (Co), copper (Cu), iron (Fe), manganese (Mn), molybdenum (Mo) and Zinc (Zn). With continuous application of sulfur free inorganic fertilizer and use of high yield variety seeds significant sulfur deficiency in soil is observed. Sulfur is recently accepted as the fourth major nutrient element that is essential for plant growth. This division is based on the amount of element absorbed by the crops, not on their function, since all these elements are equally indispensable for the balanced growth of plants.

It is therefore necessary to ensure that for each crop, the presence and availability over time of these elements, so that soil contains them in adequate quantity within precise and controllable limits, depending on the requirements and the development stage of the crops. Moreover, it is also noted that a same soil is alternatively used, for periods of varying duration, for different crops, which absorb different amount of nutrients.

It is therefore necessary to periodically balance the soil resources in relation to the changes in requirements. The controlled presence of fertilizing elements in agricultural soils affects not only the life and growth of plants but also decisively controls the microorganisms present in soil and commercial characteristics of foodstuff designed for human consumption.

Moreover, a fertilizer that does not have any provision for obtaining controlled release of nutrients is liable to a number of disadvantages. In dry soil the plants are liable to damage by excessive nutrient concentrations, while in wet conditions the nutrients are liable to be wasted as a result of being removed from the region of soil. Furthermore, in wet conditions leaching is liable to produce pollution to adjacent water bodies. These risks are particularly ameliorated by more frequent higher applications of fertilizer, which increases the application costs.

The present invention relates to the compositions, which are soluble in water or other polar solvent. The process of present invention provides phosphorous, potassium and sulfur which particularly relates to the application of glass as fertilizer for agricultural applications and for any other plant which requires phosphorous, potassium and sulfur as the constituents of their elemental combination. The material may have applications in such other field where controlled release of phosphorous, potassium and sulfur is required such as fungicide, pesticide, and weedicide and for purpose other than agriculture.

The principal object of the present invention is to provide novel glass compositions and more particularly, glass compositions that are adapted to provide major nutrient elements except nitrogen. However, it is not a simple matter to fabricate a glass for this purpose. For example, the solubility of glass in water should be relatively small in order to prevent them from being rendered unfavorable to the plant and soil through chemical reaction in the soil. Yet the solubility cannot be so small that the rate of release of the nutrients from the glass is inadequate for plant growth. Further, the glass must be non-toxic in high concentrations to plants or seeds, so that large amounts of the glass can be applied at one time to furnish an ample supply of the nutrient in the soil over an extended period of time.

The present invention is based on a glass composition of phosphorous pent-oxide and sulfur trioxide, which constitute the glass forming oxides. The composition also contains glass-modifying oxides, in particular alkali oxide such as potassium oxide, together with an oxide of one or more metals of group II and group III of periodic table such as calcium oxide or aluminum oxide. Alkali metal oxides have the effect of increasing the water solubility of the glass while the group II and group III oxides reduces the solubility. Thus by varying the composition ratio of metal oxides in the glass the solubility rate may be adjusted to a desired value.

Apart from nitrogen, phosphorous, potassium and sulfur are the other three major nutrients essential for healthy plant growth and crop yield. Strong metabolic complex between phosphorous-nitrogen assimilation and sulfur-nitrogen assimilation deficiency of phosphorous and sulfur limits nitrogen utilization efficiency of the plant and this affecting plant growth, development and yield. Phosphorous is a fascinating plant nutrient. It is involved in a wide range of plant process, starting from root development, photosynthesis, genetic transfer, cell division, crop maturity to improvement in plant disease resistance, crop quality and water use efficiency. Phosphorus after its application in soil is either removed by crop or gets converted into various insoluble forms (iron and aluminum phosphate in acid soil and calcium phosphate in alkaline soil) and gets fixed in soil clay or organic matter. The use of efficiency of phosphorous does not exceed 20%. Significant amount of phosphorous is lost from the soil through run off and erosion resulting in eutrophication of water bodies. Interaction between phosphorous-nitrogen and phosphorous-sulfur are and help in nitrogen fixation. Efficiency of phosphorous increases with initial available potassium states of soil and response in phosphorous is generally higher in high potassium soil. Thus to obtain full benefit from phosphorous fertilization, adequate potassium and sulfur supply should be ensured and to obtain full benefits from potassium and sulfur application adequate phosphorous supply should be maintained. Single super phosphate, di-ammonium phosphate, nitrophosphates, rock phosphate and NPK complexes are the conventional source of phosphorous fertilizer. All of the compounds except rock phosphate dissolves quickly in soil water. Rock phosphate is more suitable in acidic soil as otherwise its dissolution rate is so low that it cannot provide required amount of phosphate radicals for plants to absorb.

Potassium is another very important plant nutrient and is involved in root growth, photosynthesis, enzyme activation, turgor maintenance and reducing water losses and wilting, crop disease resistance, transpiration reduction, increase in protein content and enhancement of translocation of sugar and starch, thus improving grain and fodder quality. Potassium is most abundant plant nutrient in soil, but is more mobile than phosphorous and is susceptible to loss by leaching, run off and erosion. Which along with phosphorous and nitrogen increases eutrophication of water bodies. Murate of potash, sulfate of potash and NPK complexes are commonly used as potassium fertilizer. They are highly soluble and migrate from one place to another along with soil water.

Sulfur in soil is gradually reducing and around 50% of soil is found sulfur deficient. Therefore along with nitrogen, phosphorous and potassium, sulfur is considered as the fourth major nutrient required for plant growth, development and yield. Strong metabolic coupling between sulfur and nitrogen assimilation, deficiency of sulfur limits nitrogen utilization efficiency of plant and thus affecting plant growth, development and yield. Sulfur plays a significant role in all stages of plant development. It increases photosynthesis rate, chlorophyll formation, amino-acid and protein synthesis, activates enzymes, helps in vitamin formations, winter hardening etc. Gypsum, single-super phosphate and iron pyrites are the conventional sources of sulfur fertilizer of which gypsum is widely used to provide necessary sulfur to the plant but due to its high solubility in stagnant water large part of sulfate radicals derived from it percolates in the underground water damaging its quality. Repeated application of gypsum to the soil enhances calcium load on the soil.

A much more successful technique resides in preparing phosphorus-potassium-sulfur containing glass which is added directly to the soil. Under wet or damp growing conditions small amount of phosphate, potassium and sulfate radicals are made available in the immediate vicinity of the seeds and plant roots. For this the solubility of the glass in water should be relatively small in order to prevent a quick release of nutrient elements and also to prevent them from being rendered unsuitable to the plants through chemical reaction in the soil. Yet the solubility should not be so small that the rate of release of nutrients from the glass is inadequate for plant growth. Further, the glass must not contain any such element that is harmful to the plant and its growth. Further by proper selection of the glass composition soil condition can be altered locally, in particular in an alkaline soil, which is generally regarded as being difficult form to supply essential nutrients, to less alkaline or even acidic micro-environment around the roots of plants or around seeds.

Sulfate-phosphate glasses are made of highly correlated regions known as clusters, which are held together by connective tissue material. Two types of clusters-sulphate rich and phosphate rich clusters interconnected by the tissue of average composition exist in these glasses. Sulfate and phosphate rich clusters can also be of two types: clusters rich in potassium or calcium ions. Sulfate rich cluster is made of random close packing of sulfate spheres wherein potassium ion is enclosed in tetrahedral void created by four large sulfate ion spheres in contact with each other, but the spheres are oriented in such a way that the central hole can accommodate a $K^+$ ion in a virtual dodecahedron of oxygen ions. The calcium rich sulfate cluster, because of the high field strength of calcium ions, draw the ions closer and hence oxygen of different sulfate ions make more contacts with each other than to those with $K^+$ ions. The spheres of sulfate ions are so drawn by calcium ions that they overlap each other and no sulfate ion can be turned without disturbing the other sulfate ions—a kind of "interlocking" of sulfate ions occurs. The structure of phosphate rich region can be explained by the cross-linkinig between phosphate tetrahedra where the addition of alkali creates more non-bridging oxygen and the cross-linking is more effectively done by calcium ions than by potassium ions. These clusters are interconnected by tissue with average glass composition where the phosphate units are influenced by sulfate ions leading to the formations of a small concentration of dithiophosphate ($SPO_7^{3-}$) type of units.

Thus the novelty of the process of the present invention lies in the fact that phosphorous, potassium and sulfur will be released slowly into the soil in presence of water as and when required at the same time maintaining the acidity of the soil as the alkali metals are not available to the reacting system in the present material. Additionally the glasses do not contain harmful elements to the plants like $Na_2O$, $Li_2O$ and $ZnO$. The inventive step lies in the incorporation of $P_2O_5$, $SO_3$, $K_2O$, $CaO$ and $Al_2O_3$ in a novel glass composition having high weight percent of $P_2O_5$, $K_2O$ and $SO_3$.

The present day method of making glasses for agricultural application is essentially phosphate glasses containing micronutrient elements in oxide form, such as zinc, copper, magnesium, molybdenum or boron oxide or mixtures thereof; phosphate-borate glass; phosphate glass containing potassium, magnesium, calcium along with trace elements such as iron, boron, magnesium, sulfur, vanadium, copper, cobalt, zinc and molybdenum (trace elements not more than 1 wt % in aggregate); nitrogen containing slow release glass fertilizer prepared by co-melting phosphorous oxynitride and phosphorous pentoxide along with an oxide of a element of Group II or III of the periodic table; copper phosphate glass formed from cupric oxide and phosphorous pentoxide glass which also incorporates one or more glass modifying oxide such as alkali metal oxide and alumina to control solubility; alkali metal oxide-phosphorous pentoxide glass along with transition metal oxide; glass matrix comprising $P_2O_5$ as partial and/or full replacement of $SiO_2$ along with $K_2O$ as partial and/or $Na_2O$ and one or more trace element. The reference for which may be made to U.S. Pat. No. 3,930,833, dated Jan. 6, 1976: U.S. Pat. No. 3,958,973 dated May 26,1976; U.S. Pat. No. 3,762,902 dated Oct. 2, 1973; U.S. Pat. No. 4,123,248 dated Oct. 31, 1978; U.S. Pat. No. 4,148,623 dated. Apr. 10, 1979; U.S. Pat. No. 4,407,786 dated Oct. 4, 1983 and U.S. Pat. No. 6,488,735 dated Dec. 3, 2002.

The present day method of making sulfate-phosphate glasses essentially consists of mixtures of $K_2SO_4$, $ZnSO_4$ and $NaPO_3$; $ZnSO_4$, $KPO_3$ and $NaPO_3$; $K_2SO_4$, $Na_2SO_4$ and $NaPO_3$; $Na_2SO_4$, $ZnSO_4$ and $NaPO_3$; $K_2SO_4$, $Li_2CO_3$, $NH_4H_2PO_4$. The reference may also be made to, V. L. Mamoslin, V. G. Arkhipov, P. I. Bular, L. V. Ivanova and O. J. Pupkova. "Glass formation on the system $R_2SO_4(RHSO_4)$—$ZnSO_4$—$NaPO_3(P_2O_5)$, R=Li, Na, K, Fiz. Khim. Stekla 16,860-866(1990); V. L. Mamoshin."Formation of low melting glasses in $ZnSO_4$—$KPO_3$—$NaPO_3$ and $Li_2SO_4$—$Na_2SO_4$—$K_2SO_4$—$NaPO_3$ system", Glass and Ceramics 53, 166-168 (1996); M. Ganguli & K. J. Rao. "Studies of ternary $Li_2SO_4$—$Li_2O$—$P_2O_5$ Glasses", J. Non. Cryst. Solids, 243, 251-267(1999).

In our earlier Indian patent application no. 662/Del/2000 useful for making slow release high content sulfur glass the emphasis was on supplying of sulfur to the S-deficient soil with partial fulfillment in supply of phosphorous and potassium. Therefore to provide additional necessary phosphorous and potassium to the crop additional phosphorous and potassium is to be supplied through conventional inorganic fertilizers. Conventional inorganic phosphorous and potassium fertilizers, being high soluble in water, contaminate water bodies and causes eutrophication of water bodies. In order to reduce this adverse effect on water bodies mainly due to high solubility of conventional inorganic phosphorous and potassium fertilizers, it is necessary to reduce the wastage of these fertilizers by decreasing their solubility. Nutrient should be supplied according to the requirement of the particular crop.

Thus the present invention has more compatibility and larger applicability than the earlier patent as mentioned by the same inventors.

Moreover, in our earlier invention, as referred above, temperature and duration of glass melting is very critical. Slight increase in melting temperature and/or duration enhances sulfur and phosphorous loss by evolution of $SO_2$ gas which carries with it a significant amount of $P_2O_5$ which melts at much lower temperature and melting reactions starts along with localized reaction with other components that form the said glass and thereby reducing the losses in $SO_3$ and $P_2O_5$. Inventive step in the present invention lies in obtaining the required composition of glass with much ease and not so much critically dependent on melting temperature and duration as in the stated invention.

The main drawbacks of the above processes are:
1. Release of nutrients in aqueous solution is either very high or very low.
2. The glass contains alkali like $Na_2O$, $Li_2O$ that are harmful to the plants and increases soil alkalinity that hinders absorption of other nutrients by the plants.
3. The glass contains high percentage of ZnO, which is toxic to the plants.

The main object of the present invention is to provide a composition useful for making slow release nitrogen free phosphorous, potassium and sulfur oxide glass and a process of glass therefrom, which does not contain alkali like $Na_2O$, $Li_2O$ and ZnO etc that are harmful to plants.

Another object of the present invention is to increase phosphate, potassium and sulfur content of the prepared glass.

Another object of the present invention is to provide nutrients like phosphorous, potassium and sulfur to the crop in a slow and controlled manner.

Still another object of the present invention is to reduce the phosphorous, potassium and sulfur release rate when leached.

Another object of the present invention is to reduce calcium oxide content in the glass to reduce calcium load on the soil.

Still another object of the present invention is to provide phosphorous, potassium and sulfur releasing glass which minimize pollution to underground water by reducing leaching rate of the constituent elements.

Yet another object of the present invention is to provide a slow release phosphorous, potassium and sulfur combined source to the plant all through the farming period to enhance nitrogen assimilation.

Still another object of the present invention is to reduce losses of sulfate radicals to the environment so that toxic sulfur compounds do not form through microbial transformation and do not cause environmental pollution.

Yet another object of the present invention is to maintain acidity of the soil.

Still another object of the present invention is to provide essential micronutrients like zinc, boron, cobalt, iron, copper, manganese and molybdenum with low release rate in leached solution.

Accordingly the present invention provides a composition useful for making slow release nitrogen free phosphorous, potassium and sulfur oxide glass which comprises

| Constituent as oxides | Amount of oxide in wt. % |
|---|---|
| $P_2O_5$ | 20 to 35 |
| $SO_3$ | 25 to 40 |
| $K_2O$ | 15 to 30 |
| CaO | 10 to 13 |
| $Al_2O_3$ | 0.5 to 3 |

In an embodiment of the present invention the source of $P_2O_5$ in the composition may be provided as chemical compounds such as ortho-phosphoric acid, ammonium di-hydrogen orthophosphate, di-ammonium hydrogen orthophosphate, potassium di-hydrogen phosphate, tri-calcium phosphate, aluminum phosphate or the mixtures thereof.

In another embodiment of the present invention the source of $SO_3$ in the composition may be provided as chemical compounds such as potassium sulfate, potassium di-sulfate, potassium per-sulfate, potassium bi-sulfate, calcium sulfate, ammonium sulfate, aluminum sulfate or the mixtures thereof.

In yet another embodiment of the present invention the source of $K_2O$ in the composition may be provided as chemical compounds such as potassium sulfate, potassium di-sulfate, potassium per-sulfate, potassium bi-sulfate, potassium carbonate or the mixtures thereof.

In still another embodiment of the present invention the source of CaO in the composition may be provided as chemical compounds such as tri-calcium phosphate, calcium sulfate, calcium carbonate, gypsum or the mixtures thereof.

In yet another embodiment of the present invention the source of $Al_2O_3$ in the composition may be provided as chemical compounds such as aluminum sulfate, aluminum orthophosphate, alumina or the mixtures thereof.

In an embodiment of the present invention the melting may be effected for a time period in the range of 30 to 70 minutes.

The composition of the present invention is not a mere admixture but a mixture having properties, which are distinct from the mere aggregation of the properties of the individual constituents.

Accordingly, the present invention relates to a composition useful for making slow release nitrogen free phosphorous, potassium and sulfur oxide glass and a process of making glass therefrom which comprises proportioning and thorough mixing of the above composition, melting the composition at a temperature in the range of 800-1050° C. for a time 30 to 70 minutes or till the melt becomes free from the mixed components to obtain homogenized glass melt, followed by quenching the melt by known methods.

The details of the process of the present invention are given below:
1. Chemical compounds providing $P_2O_5$ 20 to 35 wt. %, $SO_3$ 25 to 40 wt. %, $K_2O$ 15 to 30 wt. %, CaO 10 to 13 wt. %, $Al_2O_3$ 0.5 to 3 wt. % are mixed thoroughly.
2. The mixed materials are melted at temperature 850 to 1050° C. for 30 to 70 minutes or till the melt becomes free from the mixed components to obtain homogenized glass melt.
3. Pouring to obtain slow release high content phosphate-potassium-sulfur glass.

The following examples are provided by the way of illustration of the present invention and should not be construed to limit the scope of the present invention.

EXAMPLE 1

The glass was made by thoroughly mixing 55.8 g of ammonium dihydrogen orthophosphate, 12.6 g of potassium sulphate, 33.4 g of gypsum, 26.8 g of potassium carbonate and 15.2 g of aluminium sulphate and heating the mixture at 1000° C. for 30 minutes and then by quenching the melt. The glass so obtained was checked for its solubility rate by treating 1.0 gm of glass powder of size 0.6 to 1.0 mm with 50 ml of distilled water for 24 hrs. The solution is then filtered. The undissolved glass was weighed after drying the residue to the constant weight. Solubility of glass is 5.7%.

The glass given in Example 1 is found suitable for food crops. There is 20-30% increase in grain yield in the case of wheat with reduced application of 30-40% K2O, 70-80% CaO & 60-70% SO3.

EXAMPLE 2

The glass was prepared by thoroughly mixing 34.8 g potassium sulphate, 34.3 g of gypsum, 18.0 g of aluminium sulfate and 46.0 g ammonium dihydrogen orthophosphate and heating the mixture at 850° C. for 40 minutes and then raising the temperature to 950° C. and kept for 10 minutes and then quenching the melt. The glass so obtained was checked for its solubility by treating 1.0 gm of glass powder of size 0.6 to 1.0 mm with 50 ml of distilled water for 24 hrs. The solution is then filtered. The undissolved glass was weighed after drying the residue to the constant weight. Solubility of glass is 2.8%.

EXAMPLE 3

The glass was made by thoroughly mixing 26.3 g potassium disulphate. 35.6 g gypsum, 24.2 g ammonium dihydrogen orthloplhosplhate, 28.0 g potassium hydrogen phosphate and 11.7 g aluminium sulfate and heating the mixture at 950° C. for 20 minutes followed by heating to 1050° C. for another 15 minutes and then by quenching the melt. The glass so obtained was checked for its solubility by treating 1.0 gm of glass powder of size 0.6 to 1.0 mm with 50 ml of distilled water for 24 hrs. The solution is then filtered. The undissolved glass was weighed after drying the residue to the constant weight. Solubility of glass is 5.0%.

EXAMPLE 4

Another way of making the glass was by melting a homogeneous mixture of 18.1 g of calcium carbonate, 55.4 g of potassium disulphate, 46.5 g of ammonium dihydrogen orthophosphate and 11.6 g of aluminium sulfate at 1000° C. for 30 minutes and then by quenching the melt. The glass so obtained was checked for its solubility by treating 1.0 gm of glass powder of size 0.6 to 1.0 mm with 50 ml of distilled water for 24 hrs. The solution is then filtered. The undissolved glass was weighed after drying the residue to the constant weight. Solubility of glass is 15.0%.

EXAMPLE 5

Another way of making the glass was by melting a homogeneous mixture of 31.8 g of gypsum, 46.8 g of potassium disulphate, 34.2 g of ammonium dihydrogen orthophosphate and 10.3 g of aluminium sulfate at 950° C. for 30 minutes and then by quenching the melt. The glass so obtained was checked for its solubility rate by treating 1.0 gm of glass powder of size 0.6 to 1.0 mm with 50 ml of distilled water for 24 hrs. The solution is then filtered. The undissolved glass was weighed after drying the residue to the constant weight. Solubility of glass is 53.0%.

EXAMPLE 6

Another way of making the glass was by melting a homogeneous mixture of 37.6 g of gypsum, 40.7 g of potassium sulphate, 48.4 g of ammonium dihydrogen orthophosphate and 1.2 g of aluminium phosphate charging at 600° C. and kept for 30 minutes and then raising the temperature to 950° C. and keeping for 10 minutes and then by quenching the melt. The glass so obtained was checked for its solubility rate by treating 1.0 gm of glass powder of size 0.6 to 1.0 mm with 50 ml of distilled water for 24 hrs. The solution is then filtered. The undissolved glass was weighed after drying the residue to the constant weight. Solubility of glass is 9.0%.

Example 6 glass is tested for oilseeds like mustard and groundnut. The increase in seed yield is 10-20% in mustard and 5-15% in the case of groundnut. Fertilizer application reduces to 30-40% P2O5, 45-60% CaO & 20-40% SO3 in mustard and 60-70% P2O5, 3-7% K2O, 65-75% Cao & 45-55% SO3 in the case of groundnut.

We claim:

1. A composition useful for making a nitrogen free phosphorous, potassium and sulfur oxide releasing glass which comprises:

| Constituent as oxides | Amount of oxide in wt. % |
|---|---|
| $P_2O_5$ | 20 to 35 |
| $SO_3$ | 25 to 40 |
| $K_2O$ | 15 to 30 |
| CaO | 10 to 13 |
| $Al_2O_3$ | 0.5 to 3. |

2. A composition as claimed in claim 1, wherein the source of $P_2O_5$ in the composition is provided as chemical compounds such as orthophosphoric acid, ammonium dihydrogen orthophosphate, diammonium hydrogen orthophosphate, potassium dihydrogen orthophosphate, tri-calcium phosphate, aluminum orthophosphate or the mixture thereof.

3. A composition as claimed in claim 1 wherein the source of $SO_3$ in the composition is provided as chemical compounds such as potassium sulphate, potassium disulphate, potassium persulphate, potassium bisulphate. calcium sulphate, ammonium sulphate, aluminum sulphate or the mixture thereof.

4. A composition as claimed in claim 3 wherein the source of $K_2O$ in the composition is provided as chemical compounds such as potassium sulphate, potassium disulphate, potassium per sulphate, potassium bi sulphate, potassium carbonate or the mixture thereof.

5. A composition as claimed in claim 4 wherein the source of CaO in the composition is provided as chemical compounds such as tri-calcium phosphate, calcium sulphate, calcium carbonate, gypsum or the mixtures thereof.

6. A composition as claimed in claim 5 wherein the source of $Al_2O_3$ in the composition is provided as chemical compounds such as aluminum sulphate, aluminum orthophosphate, alumina or the mixtures thereof.

7. A process of making glass from the composition as claimed in claim 1, wherein the process comprises proportioning and thorough mixing of the constituents of the composition to provide a mixed composition, melting the mixed composition at a temperature in the range of 850-1050° C. for a time till the melt becomes free from the mixed composition to obtain homogenized glass melt followed by quenching the melt by a known method.

8. A process as claimed in claim 7 wherein the melting is effected for a time period in the range of 30 to 70 minutes.

9. A method of providing nutrients selected from the group consisting of P, K and S to an agricultural crop, said method comprising applying a nitrogen free phosphorus, potassium and sulfur oxide releasing glass to the crop, said composition comprising:

| Constituent as oxides | Amount of oxide in wt. % |
| --- | --- |
| $P_2O_5$ | 20 to 35 |
| $SO_3$ | 25 to 40 |
| $K_2O$ | 15 to 30 |
| CaO | 10 to 13 |
| $Al_2O_3$ | 0.5 to 3. |

10. A composition as claimed in claim 2 wherein the source of $SO_3$ in the composition is provided as chemical compounds such as potassium sulphate, potassium disulphate, potassium persulphate, potassium bisulphate, calcium sulphate, ammonium sulphate, aluminum sulphate or the mixture thereof.

11. A composition as claimed in claim 1 wherein the source of $K_2O$ in the composition is provided as chemical compounds such as potassium sulphate, potassium disulphate, potassium per sulphate, potassium bi sulphate, potassium carbonate or the mixture thereof.

12. A composition as claimed in claim 2 wherein the source of $K_2O$ in the composition is provided as chemical compounds such as potassium sulphate, potassium disulphate, potassium per sulphate, potassium bi sulphate, potassium carbonate or the mixture thereof.

13. A composition as claimed in claim 1 wherein the source of CaO in the composition is provided as chemical compounds such as tri-calcium phosphate, calcium sulphate, calcium carbonate, gypsum or the mixtures thereof.

14. A composition as claimed in claim 2 wherein the source of CaO in the composition is provided as chemical compounds such as tri-calcium phosphate, calcium sulphate, calcium carbonate, gypsum or the mixtures thereof.

15. A composition as claimed in claim 3 wherein the source of CaO in the composition is provided as chemical compounds such as tri-calcium phosphate, calcium sulphate, calcium carbonate, gypsum or the mixtures thereof.

16. A composition as claimed in claim 1 wherein the source of $Al_2O_3$ in the composition is provided as chemical compounds such as aluminum sulphate, aluminum orthophosphate, alumina or the mixtures thereof.

17. A composition as claimed in claim 2 wherein the source of $Al_2O_3$ in the composition is provided as chemical compounds such as aluminum sulphate, aluminum orthophosphate, alumina or the mixtures thereof.

18. A composition as claimed in claim 3 wherein the source of $Al_2O_3$ in the composition is provided as chemical compounds such as aluminum sulphate, aluminum orthophosphate, alumina or the mixtures thereof.

19. A composition as claimed in claim 4 wherein the source of $Al_2O_3$ in the composition is provided as chemical compounds such as aluminum sulphate, aluminum orthophosphate, alumina or the mixtures thereof.

* * * * *

UNITED STATES PATENT AND TRADEMARK OFFICE
CERTIFICATE OF CORRECTION

PATENT NO.       : 7,645,314 B2
APPLICATION NO.  : 11/005806
DATED            : January 12, 2010
INVENTOR(S)      : Biswas et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1371 days.

Signed and Sealed this

Sixteenth Day of November, 2010

David J. Kappos
*Director of the United States Patent and Trademark Office*